Fig. 7.

Feb. 23, 1943. B. SCHWARZ 2,311,700
MEANS FOR IMPROVING THE COMMUTATION OF
COMMUTATOR DYNAMO-ELECTRIC MACHINES
Filed June 7, 1940 6 Sheets-Sheet 6

Inventor
Benno Schwarz
by Edwards, Bower & Pool
atty

Patented Feb. 23, 1943

2,311,700

UNITED STATES PATENT OFFICE 2,311,700

MEANS FOR IMPROVING THE COMMUTATION OF COMMUTATOR DYNAMOELECTRIC MACHINES

Benno Schwarz, Norwich, England

Application June 7, 1940, Serial No. 339,308
In Great Britain June 12, 1939

12 Claims. (Cl. 171—228)

This invention relates to means for improving commutation in dynamoelectric machines of the commutator type, including both commutator motors and generators.

Since the application of interpoles as a means for improving the commutation of alternating current commutator machines is generally not feasible for various reasons, other arrangements have been previously proposed for this purpose, but such arrangements always entail certain disadvantages.

Even in the case of direct current machines, interpoles are not always sufficient to obtain satisfactory commutation under all loads and speed conditions, more especially on account of the time lag in the case of sudden changes of the load.

It has already been proposed in commutator motors, to use an auxiliary armature winding connected in parallel with the main winding which, by a transformer effect, links the turn or turns undergoing commutation with other turns not undergoing commutation at the same time, thereby reducing the effective reactance of the commutating system and so enabling the energy contained in the leakage flux of the turns undergoing commutation, to be transferred to other systems of turns, whereby its discharge by sparking at the brushes is avoided.

The known arrangements of the auxiliary winding entail unavoidable losses, which are caused by equalizing currents passing through the two windings and created by the differences in the phase position of the voltages induced by the main field in the parallel-connected turns of the two windings. These equalizing currents and consequent losses impose, in many respects, serious limitations on the design of such machines since, in order to reduce these losses, it has been necessary to use, for instance, a large number of slots per pole, thus reducing the phase angle between the vectors representing the voltages induced in turns accommodated in adjacent slots, and to choose a comparatively high resistance per turn of the auxiliary winding.

The first measure results in larger and more costly machines, the second reduces the effectiveness of the auxiliary winding as a means for improving the commutation itself.

Furthermore, besides their harmful influence on the efficiency, these additional losses present cooling problems, especially at low speeds when these losses are usually higher and the fanning action is the least effective.

The present invention overcomes completely the difficulties inherent to such an auxiliary winding, since it eliminates all additional losses and, furthermore, increases the effectiveness of the auxiliary winding for the improvement of the commutation not only of alternating current commutator machines but also of direct current commutator machines.

Whilst it is known to improve commutation by an auxiliary winding connected in parallel with the main winding so that the turns or groups of turns of the main winding are connected in parallel with turns or groups of turns of the auxiliary winding, and connected to the same commutator bars, in the present invention the turns of the auxiliary winding are accommodated and distributed in the armature slots in a novel manner, such that they form transformer windings, so linking the circuits of the main turns or groups of turns to obtain, in these turns or groups of turns of the auxiliary winding, induced voltages which are equal not only in value but also as regards their phase position, to the voltages induced in the parallel-connected main turns.

The invention comprises an arrangement wherein the consecutive coils of the main winding situated in different slots or partly in different slots are connected in parallel with groups of turns of the auxiliary winding accommodated in other slots, either belonging to the same system of slots or to a separate system in the main armature or in an auxiliary armature. The slots are, in any case, arranged in such manner that a magnetic flux can be developed which links the different systems of auxiliary turns together and, at the same time, is at least partly independent of the leakage flux linked with the parallel-connected systems of the main turns.

According to the invention, moreover, the turns of the auxiliary winding forming the primaries and secondaries of the transformers, linking main turns in different or partly different slots are, at least partly, accommodated in different slots, so that the transformers contain a system of primary and secondary turns or conductors of looser linking, i. e., only linked by the common flux of adjacent slots. In these turns or conductors, which are connected in series with turns or conductors closely linked by their position entirely in the same slots, voltages of such a phase position are induced that, added together, they give a resultant voltage equal in value to the voltage, and of the same phase position as the phase position of, the parallel-connected main turns. Furthermore, these auxiliary turns of looser linking with turns of one adjacent auxiliary system, are closely linked with turns of the other neighboring auxiliary system on the other side of it and, in this way, all auxiliary turns can be closely linked with turns of one or the other adjacent systems, forming thus the primaries of transformers with at least two secondaries each.

Further, in accordance with the invention, the turns of the auxiliary windings forming the windings of the above-mentioned transformers can be distributed also under different pairs of poles, in which case they form a wave winding and can be connected in parallel with a main winding of the wave or lap type.

According to the invention, the auxiliary system can, at the same time, be used to replace, in a most effective way, equalizers, thus simplifying and cheapening the construction of the machine. Compared with the known arrangement of auxiliary windings, which have auxiliary turns arranged in one pair of slots and connected in parallel with turns of the main winding in different slots or vice versa, and which, therefore, are bound to show different phase positions of the voltages of the parallel-connected systems, the arrangement according to the invention is free from this disadvantage, and machines according to the invention can, therefore, be built without the above-mentioned limitations.

Furthermore, the advantages obtained by the new arrangement are not confined to the elimination of all additional losses and heating resulting from these losses.

There is also no necessity, in the winding according to the invention, to rely on high resistance of the auxiliary turns for the purpose of limiting equalizing currents. The resistance of these turns can be so chosen as to obtain the maximum effect in the improvement of the commutation. This becomes clear from the consideration that the ohmic voltage drop created by the non-commutated current at the end of the commutation period in the group of turns acting as the transformer windings, which link the main turns under commutation with the adjacent turns, appears as the remaining commutation voltage on the brushes.

In order to keep this voltage down and below the permissible value to avoid sparking, the only possibilities are, either to keep the commutator current within certain limits or to reduce the ohmic resistance of the auxiliary system.

As the latter possibility is afforded by the arrangement according to the invention, there is no necessity to limit the value of the commutated current.

The auxiliary system can be used also to carry part of the main current, especially in those cases hereinafter described, where full pitch auxiliary windings are used. Furthermore, the winding according to the invention, is not confined to main windings with more than one coil per pair of slots, which removes another limitation of the design.

Examples of windings according to the invention are illustrated by the accompanying drawings, in which.

In the following description, the turns of the windings will be designated by the numerals indicating the slots in which the conductors are accommodated.

Figures 1, 2, 4:
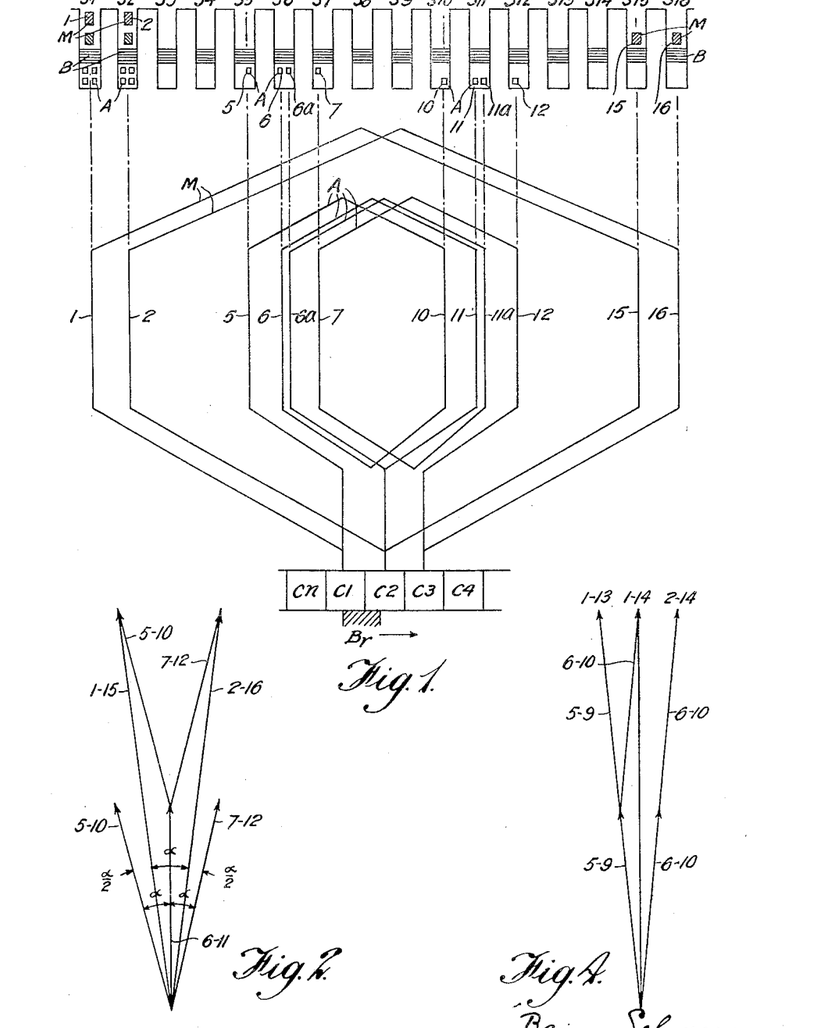
Figure 1 is a winding diagram showing part of a winding according to the invention and, above it, diagrammatically as a developed sectional view, a few of the armature slots with the conductors corresponding to those shown in the winding diagram, accommodated in the slots, other conductors of the auxiliary winding being shown in the first two slots, to illustrate the arrangement of the layers.
Figure 2 is a vector diagram illustrating graphically, the induced voltages in the arrangement of Figure 1.
Figure 4 illustrates the vector diagram associated with the winding diagrammatically represented by Figure 3.

In the example illustrated by Figure 1, the armature winding is composed of a main winding M which is accommodated in the upper part of the armature slots S (1—16) so as to provide one bar per layer and slot, and an auxiliary winding A, which is situated in the bottom of the slots.

A magnetic bridge B, consisting conveniently of strips of sheet iron, is arranged between the two windings M and S.

The main winding M is a plain lap winding. Its pitch $Pm$, measured in slot pitches is, in this example, S 1—15, or 14 slot pitches. Its first illustrated turn 1, 15, which comprises the upper bar in slot S1 and the lower bar in slot S15, above the magnetic bridge B, is connected to the segments C1 and C2 of the commutator, illustrated diagrammatically at C, with brush Br.

The next turn 2, 16, which comprises the upper bar in slot S2 and the lower bar in slot S16, is connected between the commutator bars C2 and C3, and so on.

The auxiliary winding A is also a lap winding. It has two turns per commutator bar and a pitch $Pa$ of 5 slot pitches only. Owing to its double turns, it has two conductors per layer, as shown in Figure 1 at the bottom of slots S1 and S2. As the pitch of the auxiliary winding A approximates to ⅓ of that of the main winding M, assuming the number of slots per pole to be 15, or near 15, two turns of the auxiliary winding will have practically the same numerical values of voltage, induced by the same flux, as the voltage of the one turn of the main winding. Any slight difference which might occur results only in some difference in the flux passing through the magnetic bridge B, which requires only a very low value of magnetizing current in the two systems.

The first illustrated pair of series-connected turns 5, 10, and 6, 11, of the auxiliary winding A are connected between the commutator bars C1 and C2. These two turns are accommodated in the bottom of two different pairs of armature slots, namely, the slots S5 and S10 for the first turn and the slots S6 and S11 for the second turn, respectively. The next pair of series-connected turns 6a, 11a and 7, 12 of the auxiliary winding, which are accommodated in the armature slots S6, S11 and S7, S12, respectively, are connected between the commutator bars C2 and C3, and so on. Each series-connected pair of turns of the auxiliary winding A is thus connected in parallel with one turn of the main winding M.

The two auxiliary turns connected in parallel with each of the main turns can be considered as the primary or secondary of transformers which transfer the energy of the leakage fluxes linked with the commutating main turn to the adjacent main turns.

Taking, for instance, the main turn 1, 15, which is actually commutating as the brush Br touches the two commutator bars C1 and C2, the commutation of the current in this main turn 1, 15 is connected with the change in direction of the leakage flux linked with the respective slots. This change of the leakage flux induces a voltage, the so-called reactance voltage, of commutation in the turn 1, 15. This voltage, if exceeding a certain value, causes sparking at the brushes, especially when the brush interrupts the short circuit current between the commutator bars C1 and C2, that is to say, when it leaves the commutator bar C1 at the end of the commutation period. This voltage is also applied to the series-connected auxiliary turns 5, 10 and 6, 11, which are connected to the same commutator bars C1 and C2 as the main turn 1, 15. These two auxiliary turns 5, 10 and 6, 11 can be considered as the primary of a transformer, one secondary of which is constituted by the series-connected auxiliary turns 6a, 11a and 7, 12, which are connected to the commutator bars C2 and C3. There is, thus, induced in this secondary 6a, 11a and 7, 12 by this transformer action, a similar voltage to that applied to the primary 5, 10 and 6, 11 of the transformer. As the two auxiliary turns 6a, 11a and 7, 12, connected to the commutator bars C2 and C3, are themselves parallel-connected with the main turn 2, 16, this main turn short circuits the secondary voltage of the transformer, which means that the reactance of the main turn 2, 16 is paralleled with the reactance of the commutating main turn 1, 15, so approximately halving its value. It will be seen that the primary and the secondary of the described transformer each consist of two parts, namely, the parts 5, 10 and 6, 11, constituting the primary, and the parts 6a, 11a and 7, 12, constituting the secondary, and that each part is represented by one turn of the auxiliary winding.

The two auxiliary turns 6, 11 and 6a, 11a, in the slots S6 and S11, which belong to the primary and secondary of the transformers, are closely linked. As they are situated in the same slots, all main and leakage fluxes with which they are linked, whatever their path may be, are exactly the same. The turns 5, 10 and 7, 12, which also belong to the primary and secondary of the transformers, are not, however, so closely linked with each other. There is, however, only the leakage between adjacent slots, which introduces a certain reactance between these turns. Furthermore, the primary turn 5, 10, for instance, is closely linked with another turn in the same slots, which is part of another transformer secondary, represented by the adjacent turns of the auxiliary winding (not shown in the figure) connected to the commutator bars C1 and Cn.

The reactance is decreased, furthermore, in this way, by the parallel connection of another main turn in adjacent slots to the left from slots S1, S15. On the other side, the auxiliary turn 7, 12 is closely linked to another turn (not shown) in the same slots which belongs to the auxiliary system connected to the commutator bars C3 and C4, parallel-connected to a main turn (not shown) in slot S3 and the next slot beyond S16. Each auxiliary system acting as a transformer primary is, therefore, closely linked with the two adjacent systems which form, in this way two secondaries of the "commutation transformer" besides the linking with the conductors in the other layers of the same slots belonging to turns displaced by 5 slots. In this way, step by step linking of all main turns and the parallel connection of their reactances by means of such transformer systems, proceed over the whole armature, so resulting in a negligible amount of reactance for the actual commutating main turn.

This result is obtained without any difference in the voltages of parallel-connected main and auxiliary systems, as will be evident from the vector diagram shown in Figure 2. The vector diagram shown in this figure, illustrates the vectorial position of the voltages in the turns of the main and auxiliary windings. The vectors are designated each by the two figures indicating the two armature slots in which the conductors forming the respective turns are placed.

Assuming the voltage of the main turn 1, 15 has the phase position and magnitude indicated by the vector 1—15, then the turn 2, 16 will have a voltage of the same magnitude, as illustrated by the vector 2—16, but with a phase displacement which is equal to the electrical phase displacement α of one slot relatively to the adjacent one.

Each of the auxiliary turns in the slots S6 and S11 will then have the position shown by the vector 6–11 in the vector diagram, as their electrical axis is exactly mid-way between the two aforementioned main turns. The magnitude of the voltage of each auxiliary single turn will be about half of that of one main turn.

The phase position of the voltage vectors 5—10 and 7—12 will be displaced by α in opposite directions relatively to the vector 6—11 as shown in the diagram. In order to find the voltages induced in the two auxiliary turns connected in series to the commutator bars C1 and C2, the vectors 6—11 and 5—10 are added, which gives a vectorial sum equal in amount and phase position to the vector 1—15 for the main turn connected in parallel to the same commutator bars.

The two turns 6a, 11a and 7, 12 connected to the commutator bars C2 and C3 and having voltage values represented by the voltage vector 6—11 (Figure 2) since these turns are accommodated in the slots S6 and S11, give the same vectorial sum as the voltage vector of the main turn 2, 16. The same refers to all other parallel-connected main and auxiliary systems.

In the further examples now to be described, the auxiliary winding A is shown for the sake of clarity, diagrammatically below the commutator C, i. e., displaced 180° from its actual position and, in Figures 3 to 6, the armature slots are shown diagrammatically in dotted lines on the winding diagram itself, to facilitate the understanding of the description.

Figure 3:
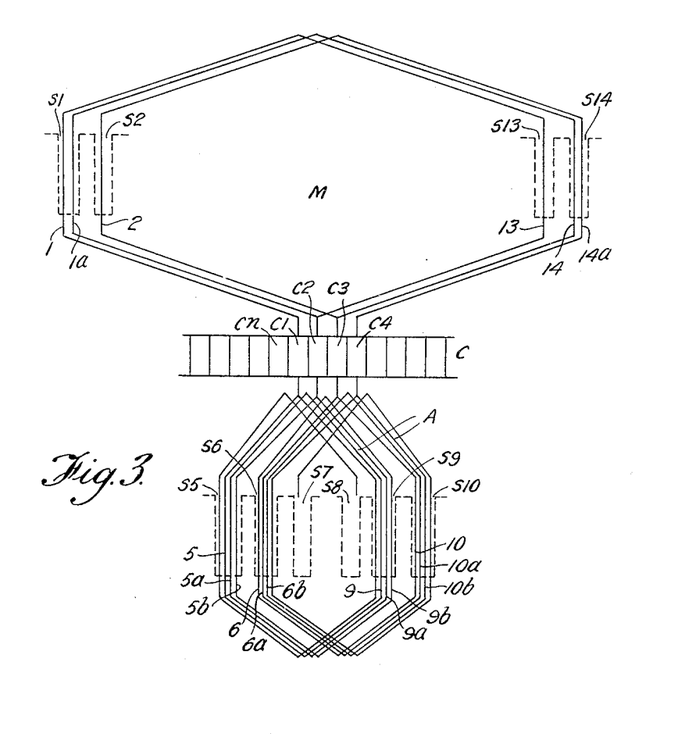
Figure 3 is a winding diagram of another example of the winding according to the invention.

In Figure 3, the main winding M is a lap winding having two bars per layer and the pitch of the turns is alternately 12 and 13 slots, the pole pitch being or closely approximating 12½ slots.

The auxiliary winding A has four conductors per layer (8 conductors per slot) and pairs of turns of this winding according to their pitch (of about ⅓ of the pole pitch) are connected in series between adjacent commutator bars.

The first illustrated main turn 1, 13 is connected to the commutator bars C1, C2. Two series-connected turns 5, 9 and 5a, 9a of the auxiliary winding A, both in the slots S5, S9, are also connected to the commutator bars C1, C2 and are thus in parallel connection with said first main turn.

The next main turn 1a, 14 is connected to the commutator bars C2, C3, and two series-connected turns 5b, 9b and 6, 10 of the auxiliary winding are connected also to the commutator bars C2, C3 and, therefore, in parallel connection with the main turn 1a, 14.

The next main turn 2, 14a is connected to the commutator bars C3, C4, to which two series-connected auxiliary turns 6a, 10a and 6b, 10b are also connected, and so on.

Referring now to the vector diagram, Figure 4, it will be seen that the voltage induced in the turn 1, 13 of the main winding and designated by the vector 1—13, has the same phase position as the voltage induced in the two series-connected turns 5, 9 and 5a, 9a of the auxiliary winding designated by the vectors 5—9, so that the vectorial sum of the voltage vectors for the said two auxiliary turns is equal to the voltage vector for the main turn 1, 13.

It will be seen also, that the voltage vector 1—14 for the main turn 1a, 14 is displaced by only half the electrical angular displacement of two adjacent slots, and that the voltage vectors 6—10 for the auxiliary turns 6a, 10a and 6b, 10b are in phase with the voltage vector 2—14, for the main turn 2, 14a.

The vectorial sum of the vectors 5—9 and 6—10 is, therefore, equal as regards value and phase position, to the voltage vector 1—14.

In the auxiliary system connected to the commutator bars C3 and C4, the two auxiliary turns 6a, 10a and 6b, 10b, in slots S6, S10, give the same voltage as the main turn 2, 14a in slots S2, S14.

Considering now, for example, the linking of the main turn 1, 13 by the action of the auxiliary winding, the auxiliary turns 5, 9, and 5a, 9a, in slots S5, S9, parallel-connected to said main turn are, as the primary of a commutation transformer, closely linked with two auxiliary turns situated in the same slots, one belonging to the system connected to commutator bars C2, C3 and the other belonging to the system connected to the commutator bars Cn, C1.

They are, furthermore, less closely linked with the second turns in the adjacent slots belonging to the same systems, and partly linked with the conductors in the same slots in the other layer, i. e., in the bottom layer in slot S5, and the top layer in slot S9, which belong to auxiliary winding systems displaced by four slots on each side.

Furthermore, the main turn 1, 13 has its conductor 1, in slot S1, linked magnetically with one conductor 1a (in the same slot) of the main turn 1a, 14, while the other conductor 14 (in slot S14) of this main turn 1a, 14 is magnetically linked with the conductor 14a (also in slot S14) of the main turn 2, 14a. There is, therefore, a multiple system of magnetic linking in the auxiliary and main turns.

A lap main winding of the character described with reference to Figure 3 is, by itself, advantageous in certain circumstances as regards commutation.

In the present case, however, where all the turns of this main winding are parallel-connected to systems of auxiliary turns, a new effect is obtained, as the result of these parallel-connected auxiliary turns is the parallel connection of further reactances by means of intermediate transformers which, as previously shown, continues not only in one way but in two or more ways, through the main and auxiliary systems over the whole armature in both directions.

Similar arrangements are possible, according to the invention, with main windings arranged as a wave winding or series-parallel winding, the auxiliary winding being a lap, wave or series-parallel winding in different combinations.

The arrangement of the main winding as a series or series-parallel winding shows a similar result regarding the magnetic linking with adjacent turns, as shown in Figure 3 for the conductors of the turns of a parallel winding, with alternately different pitch, as turns contained in one convolution, i. e., between two adjacent commutator bars of a series winding, are positioned under different pairs of poles in common slots with turns belonging to different systems.

Some of the combinations mentioned above result in approximate full pitch auxiliary windings. This can for instance be the case if a main wave winding is combined with an auxiliary lap winding. One example of such an arrangement is shown in the Figure 8. The winding refers to a four pole machine with twenty-three slots and six conductors per slot for the main winding, and twelve conductors per slot for the auxiliary. The commutator consists of sixty-nine commutator bars and the main winding is a single closed wave winding.

Figure 8:
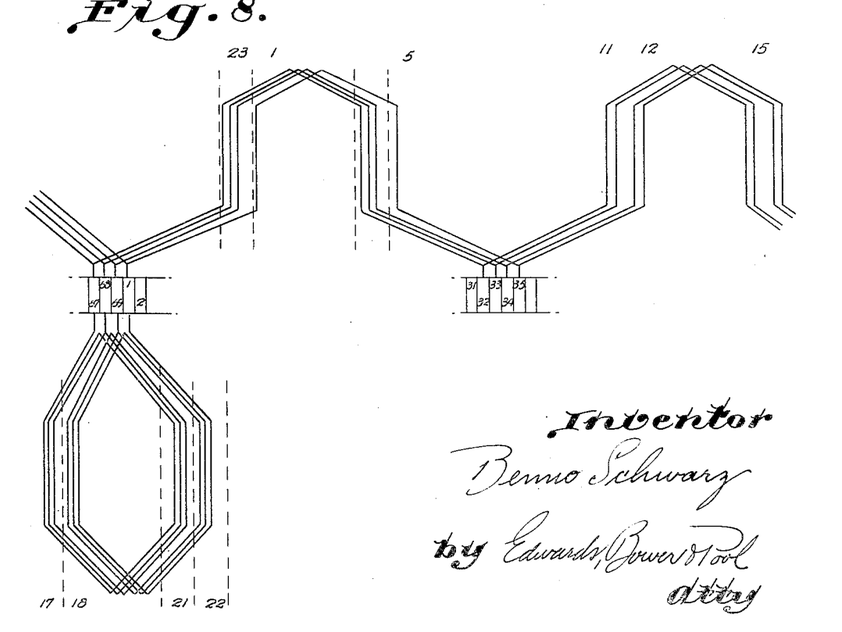

As there are two turns of the main winding between adjacent commutator bars the voltage between adjacent bars is twice the voltage of one turn. The auxiliary winding which is a lap winding contains two turns per bar, and by being arranged with approximately full pitch the same voltage per commutator bar as in the main winding, that means twice the voltage per turn, is obtained for this winding as well.

As in the example of Figures 3 and 4 there are groups of auxiliary turns between adjacent commutator bars that are accommodated in the same slots—for instance the two turns between the commutator bars 1 and 69 in the slots 22—18 alternating with groups of two turns being accommodated in different slots, as for instance the two auxiliary turns between commutator bars 69 and 68, which are arranged in two different pairs of slots, namely 22—18 and 21—17.

The arrangement of the auxiliary turns belonging to one group between adjacent commutator bars is made in such a way that it conforms with the vectorial position of the parallel connected main turns, which in this case consist of two series connected turns lying under different pairs of poles, and having different vectorial positions with reference to their respective pairs of poles, the vectorial sum of the voltages induced in each of such groups being exactly in phase with the voltages of the parallel connected auxiliary turns induced by the main flux. This is the case although the individual voltages per turn are of different phase position from those of the individual turns of the parallel connected group of main turns already of different phase position from one another and moreover a certain proportion of such groups of auxiliary turns also consists of individual turns of different phase position. The independence of the leakage fluxes linked with parallel connected main and auxiliary turns is in the first place obtained in this case by the fact that the main winding is a wave winding and the auxiliary winding is a lap winding, so that the slots accommodating parallel connected turns of both windings are partly under different poles.

Furthermore, the pitch of both the windings is slightly shortened compared with the full pole pitch, so that the parallel connected turns of the two windings are in different slots, as shown in Figure 8, even under those poles where there are parallel connected turns of both windings.

A series winding of any description used for the auxiliary winding, results in an arrangement where the windings of the commutation transformers are distributed over two or more pairs of poles, with close and looser linking of the primaries and secondaries alternating in different ways, according to the number of pairs of poles in the machine and the specific structure of the winding.

Figure 5:
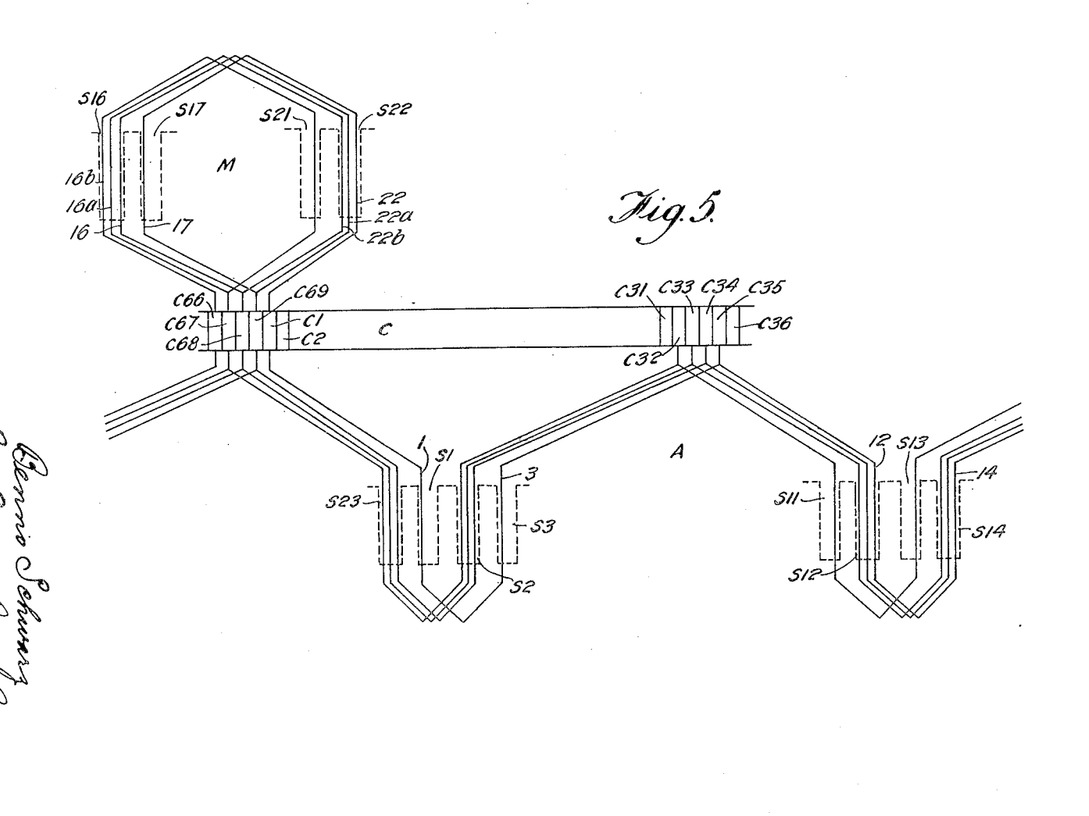
Figures 5, 6, 7, 8 and 9 are diagrammatic representations of further examples of armature windings, in accordance with the invention, a few armature slots with the windings accommodated therein, being shown above the winding diagram in Figure 7.
Figure 6:
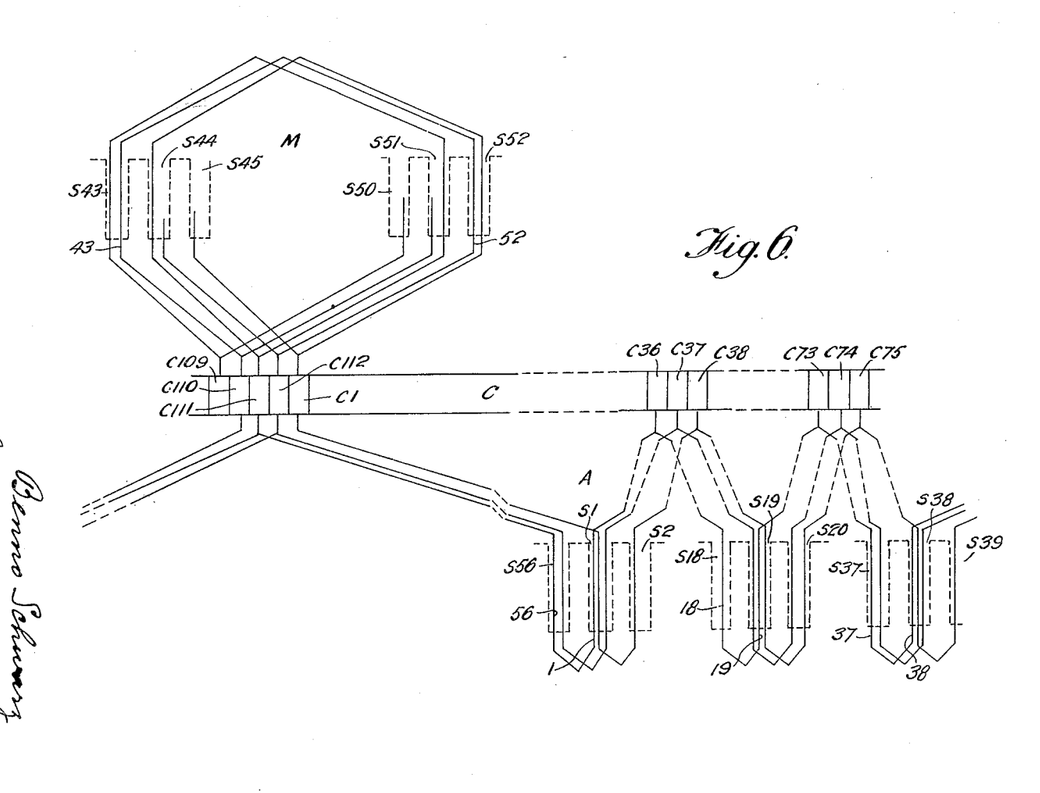
Figure 9:
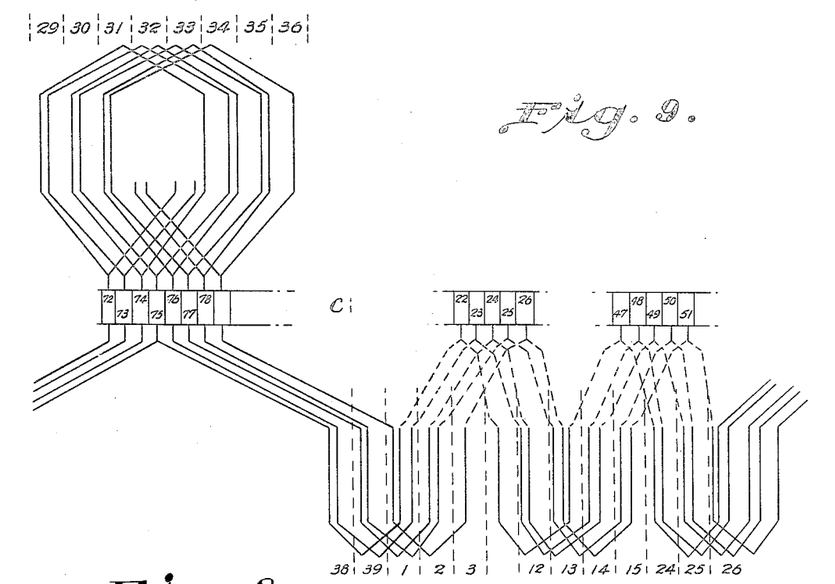

The use of series or series-parallel windings as auxiliary windings in connection with lap main windings, results in further advantages of the arrangement according to the invention, as will be appreciated from the examples illustrated by Figures 5, 6 and 9.

Referring to Figure 5, which shows part of the armature winding of a 4 pole armature with 23 slots, the main winding M is a lap winding with three bars per layer in the slot, the commutator C having 69 bars.

The auxiliary winding A is a wave winding with shortened pitch—two slot pitches—i. e., about ⅓ of the pole pitch, so that two turns in series result in the same voltage as the voltage of one main turn with the full pitch.

The main winding M has an alternating pitch of 5 and 6 slots.

It will be seen from the diagram that the commutation transformer for the main turn 22, 17, for example, which turn is connected between the commutator bars C1 and C69, has a transformer primary, which consists of the two auxiliary turns 1, 3 and 12, 14. The auxiliary turn 12, 14 is closely linked with the turns in the same slot belonging to the auxiliary system between the commutator bars C69 and C68 and is also closely linked to a further turn in the same slots belonging to the auxiliary system, connected to the bars C68 and C67. These auxiliary systems include turns in the slots S23 and S2, which are closely linked with one turn of the auxiliary system connected to the commutator bars C67 and C66. In this way, a parallel connection, by means of all these transformers, is obtained directly with the main turns 22a, 16 and 22b, 16a connected to the commutator bars C69, C68 and C68, C67 and indirectly to the main turn 21, 16b, in the slots S21, S16, and so on.

Furthermore, a loose linking between the above considered main turn 22, 17 is also obtained through the conductors in the slot S22. In addition, the auxiliary turn 1, 3 is loosely linked with the auxiliary turns in the adjacent slots S23, S2 which results in another transformer action, adding to those already described. The same applies to the turns not shown in the diagram to the right of the system connected to the commutators bars C1, C69.

Besides this almost perfect reduction of the effective reactance of commutation to a negligible amount, there is another advantage of this arrangement, namely, that the auxiliary winding acts also as an equalizing system for the main lap winding. Each turn of the auxiliary wave winding forms, at the same time, an equalizer between the two pairs of poles.

As the main lap winding has an old number of turns and the number of pairs of poles is 2, no equipotential points exist on the commutator in use of this lap winding alone. Hence, in use of a lap winding of this character alone equalizers would have to be arranged between commutator bars on one side and the front connections of the turns on the other pair of poles, which is the reason why a lap winding of this description would normally not be used.

The difference in the potential between commutator bars on opposite points of the commutator of half the voltage of one main turn is, however, overcome by the fact that the shortened pitch of the auxiliary winding resulting in a voltage per turn of half the full voltage, makes such a turn suitable to act as an equalizer. The equalizing effect is a highly satisfactory one, as every commutator bar is connected to the auxiliary winding.

In the example illustrated by Figure 6, the main winding M is a double lap winding with the purpose of reducing the voltage between adjacent commutator bars to half the amount determined by the full flux. The winding is a 6 pole winding accommodated in 56 slots S with four conductors per slot and two conductors per layer.

The auxiliary winding A is a wave winding with the same number of conductors and requires, therefore, to have a pitch resulting in ⅛ of the voltage per turn compared with that of the main turn which, in the example illustrated, is a pitch of one slot pitch. In this way, three series-connected turns of the auxiliary winding, for example, turns 56, 1, 18, 19 and 37, 38 connected to adjacent commutator bars C111 and C110, give half the voltage of one main turn, in the case in question, the main turn 43, 52, so dividing the potential between the commutator bar C110 and C112, belonging to one circuit of the double lap winding and connected to this main turn 43, 52, into equal parts and thus securing the relative potential of the two circuits of the main winding, by fixing the potential of the commutator bar C111 belonging to the other circuit of the double lap winding, halfway between the adjacent bars C110 and C111.

The auxiliary winding acts, therefore, not only as equalizers between the different pairs of poles but also as the equalizers otherwise necessary to fix the relative potential of the two parts of the double lap winding against one another.

The effect on the resulting reactance of the commutation is a similar one to that described previously. The linking of different systems is extended to three pairs of poles and by means of different adjacent systems of auxiliary turns, also from one circuit of the double lap winding to the other.

Figure 9 shows another example for a main multiple winding in the shape of a double lap winding. The winding is developed for a six pole armature with thirty-nine slots and four conductors per slot for both the main and auxiliary winding. The main winding is again a double lap winding, the auxiliary winding, however, is a series parallel winding with six parallel circuits, whereas the main winding as a double lap winding shows 2×6=12 circuits.

Following up the series parallel winding, say starting from the commutator segment C1, it will be found that there are three turns under three different pairs of poles of this winding before one gets back to segment 76, which is connected to the second system of main turns. Only by following up another group of three turns of the auxiliary winding, which end at segment 73, the auxiliary winding gets back to a commutator segment in direct connection with the part of the main winding connected to the starting point at the commutator bar C1. It will be seen from that that six turns of the auxiliary winding are parallel connected to three turns of the main winding, so that each auxiliary turn must show half the voltage of a main turn.

It will be seen without further explanation from Figure 9 that all the conditions regarding equality of voltage induced by the main flux in the parallel systems, and regarding independence of the respective leakage fluxes of the parallel connected turns, are fulfilled.

It is furthermore clear that the auxiliary winding which is a single closed series parallel winding, and touches therefore the whole of the commutator segments when followed up throughout, secures the equal potential under different pairs of poles and the relative potential of the two separate circuits of the double lap winding at the same time without requiring equalizers of the first nor of the second order.

The auxiliary winding can, according to the invention, be utilized also so as to provide for the interposition of intermediate commutator bars between the main commutator bars connected to the main winding, in order to divide the voltage between bars into two or more parts. This is especially important in the case of alternating current commutator motors where the voltage between the adjacent bars acts as a so-called transformer voltage, and creates parasitic currents through the turns short circuited by the brushes which form, as is well known, one limitation of the possible output of such machines per pair of poles.

The intermediate bars can be connected to tappings of the auxiliary winding.

Figure 7:
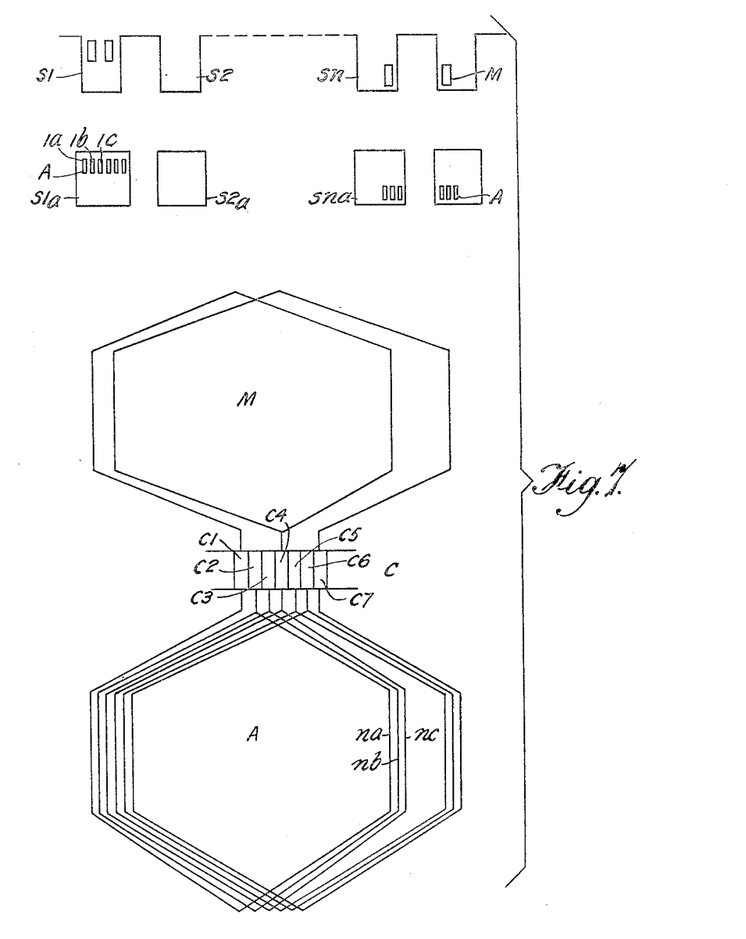

One example of such an arrangement is shown in Figure 7 which illustrates part of the winding diagram, a few of the associated armature slots being shown above the winding diagram. The main winding M is a single parallel winding, each turn of which is connected to a pair of commutator bars with two bars between them, that is to say, one turn is connected between bars C1 and C4, the next between C4 and C7, and so on.

The main winding M is accommodated in slots S1, S2, Sn.

The auxiliary winding A is accommodated in separate slots S1a, S2a, Sna, in the same armature, but of such a distance to the slots S1, S2, Sn of the main winding, that part of the main flux can pass between the two systems of slots.

The magnetic circuit of the auxiliary winding is, therefore, practically completely independent of the magnetic circuit of the main system. It is, therefore, possible to use the full pitch also for the auxiliary turns, the auxiliary winding being linked only with a third of the main flux, as each of its turns is, as shown, connected between an adjacent pair of commutator bars C and, therefore, three series-connected turns of the auxiliary winding are parallel-connected to one turn of the main winding as, for example, the three series-connected auxiliary turns 1a, 1b, 1c parallel-connected to the main turn between the commutator bars C1, C4.

The voltage between the commutator bars C1 and C4 is obviously divided into three equal parts by the intermediate bars C2 and C3, so that adjacent bars show only a transformer voltage of a third of that connected with the main flux. On the other hand, any current entering the armature winding through the commutator bars C2 and C3 will not result in any additional reactance, as this current is divided into two parts which flow in opposite directions through turns accommodated in the same slots, so that no magnetizing effect of this current can develop.

The linking effect between the different systems of auxiliary turns is obtained by groups of conductors such as na, nb, nc, and so on, accommodated in the same slots Sna, with groups of conductors of other adjacent and non-adjacent systems, and is assisted by the linking of different main turns through main conductors in the same slots, e. g., the main conductors in slot S1.

The sub-division of the voltage per turn can be increased, furthermore, by more intermediate commutator bars C, or by the use of double lap windings in addition to intermediate bars interposed between the main bars.

It will be appreciated from the previously given explanations, that the equality of the value of the voltages induced in parallel-connected turns of the main and auxiliary windings in all those cases where they are accommodated in the same armature slots is based on a sinusoidal distribution of the field on the periphery of the armature, in so far as shortened pitches of the auxiliary winding are used.

This arrangement has, on the other hand, the result that higher harmonics of the field do not induce equal amounts of voltages in the parallel-connected turns, so that equalizing currents of different frequency from the main frequency will flow in series through the parallel-connected turns without passing the commutator and the brushes, which currents will de-magnetise the higher harmonics of the field. The remaining field will be essentially of sine form, with the result that the detrimental effect of the transformer voltages of higher frequency is completely avoided, the presence of these voltages which are short circuited by the brushes, in the turns actually undergoing commutation being another reason, besides the reactance and transformer voltage, for the commutation difficulties of alternating current commutator machines.

In the case of direct current machines, where the main field is, in general, not of sine form, arrangements according to the invention with full pitch auxiliary windings are preferably used.

I claim:

1. An armature for an alternating current commutator machine with laminated iron core and slots therein the said slots containing an armature winding consisting of a lap main winding accommodated in the top part of said slots, and an auxiliary winding parallel connected to and having a higher reactance than the said main winding, the said auxiliary winding being accommodated in the bottom part of the said slots, wound in the same direction as, but with a different pitch from the main winding, and containing groups of at least two turns between adjacent commutator bars, the turns belonging to each of said groups being accommodated in different slots from those slots accommodating the turns of the said main winding connected to the same commutator bars, and the said turns of each group being accommodated individually in at least two different pairs of slots.

2. An armature for an alternating current commutator machine with laminated iron core and slots therein, the said slots containing an armature winding consisting of a lap main winding accommodated in the top part of said slots, and an auxiliary winding parallel connected to and having a higher reactance than the said main winding, the said auxiliary winding being accommodated in the bottom part of the said slots, wound in the same direction as, but with a different pitch from the said main winding, and containing groups of at least two turns between adjacent commutator bars, the turns belonging to each of the said groups being accommodated in different slots from those slots accommodating the turns of the said main winding connected to the same commutator bars, and the individual turns of each of some of said auxiliary winding groups numerically equal to at least the number of armature slots, being accommodated in at least two pairs of different slots, whilst each of the remaining auxiliary winding groups has its turns accommodated in one and the same pair of slots.

3. An armature for an alternating current commutator motor with laminated iron core and slots therein, the said slots containing an armature winding consisting of a lap main winding accommodated in the top part of said slots, the said main winding consisting of turns of different pitch connected to subsequent commutator bars, and an auxiliary winding parallel connected to and having a higher reactance than the said main winding, the said auxiliary winding being accommodated in the bottom part of the said slots, wound in the same direction as, but with a different pitch from the main winding, and containing groups of at least two turns between adjacent commutator bars, the turns belonging to each of the said groups being accommodated in different slots from those slots accommodating the turns of the said main winding connected to the same commutator bars, and the individual turns of each of some of said auxiliary winding groups numerically equal to at least the number of armature slots, being accommodated in at least two pairs of different slots, whilst each of the remaining auxiliary winding groups has its turns accommodated in one and the same pair of slots.

4. An armature for an alternating current commutator machine with laminated iron core and slots therein, the said slots containing an armature winding consisting of a wave main winding accommodated in the top part of said slots, and a lap auxiliary winding parallel connected to and having a higher reactance than the said main winding, the said auxiliary winding being accommodated in the bottom part of the said slots, wound in the same direction as the said main winding, and containing groups of at least two turns between adjacent commutator bars, the turns belonging to each of the said groups being accommodated in different slots from those slots accommodating the turns of the said main winding connected to the same commutator bars, and the individual turns of each of some of said auxiliary winding groups numerically equal to at least the number of armature slots, being accommodated in at least two pairs of different slots, whilst each of the remaining auxiliary winding groups has its turns accommodated in one and the same pair of slots.

5. An armature for an alternating current commutator machine with laminated iron core and slots therein, the said slots containing an armature winding consisting of a wave main winding accommodated in the top part of said slots, and a wave auxiliary winding parallel connected to and having a higher reactance than the said main winding, the said auxiliary winding being accommodated in the bottom part of the said slots, wound in the same direction as the said main winding, and containing groups of at least two turns between adjacent commutator bars, the turns belonging to each of the said groups being accommodated in different slots from those slots accommodating the turns of the said main winding connected to the same commutator bars, and the turns of said groups being accommodated in at least two pairs of different slots situated under different pairs of poles, the said pairs of slots accommodating also turns belonging to at least one of said groups of auxiliary turns connected to adjacent commutator bars.

6. An armature for an alternating current commutator machine with laminated iron core and slots therein, the said slots containing an armature winding consisting of a lap main winding accommodated in the top part of said slots, and a wave auxiliary winding parallel connected to and having a higher reactance than the said main winding, the number of commutator bars being in accordance with the requirements of the wave auxiliary winding and not divisible by the number of poles, the said auxiliary winding being accommodated in the bottom part of the said slots, wound in the same direction as, but with a different pitch from the said main winding, and containing groups of at least two turns between adjacent commutator bars, the turns belonging to each of the said groups being accommodated in different slots from those slots accommodating the turns of the said main winding connected to the same commutator bars, and the turns of said groups being accommodated in at least two pairs of different slots, situated under different pairs of poles, the said pairs of slots accommodating also turns belonging to at least one of said groups of auxiliary turns connected to adjacent commutator bars.

7. An armature for an alternating current commutator machine with laminated iron core and slots therein, the said slots containing an armature winding consisting of a lap main winding accommodated in the top part of said slots, and a series parallel auxiliary winding parallel connected to and having a higher reactance than the said main winding, the number of commutator bars being in accordance with the requirement of said series parallel auxiliary winding, the said auxiliary winding being accommodated in the bottom part of the said slots wound in the same direction as the main winding and the groups of turns of said auxiliary winding containing as many series connected coils as there are pairs of poles being accommodated in different slots from those slots accommodating the turns of the said main winding connected to the same commutator bars, and the turns of said groups being accommodated in at least two pairs of different slots situated under different pairs of poles, the said pairs of slots accommodating also turns belonging to at least one of said groups of auxiliary turns connected to adjacent commutator bars.

8. An armature for an alternating current commutator machine with laminated iron core and slots therein, the said slots containing an armature winding consisting of a multiple lap main winding accommodated in the top part of said slots, and a wave auxiliary winding parallel connected to and having a higher reactance than the said main winding, the number of commutator bars being in accordance with the requirements of the wave winding, and not divisible by the number of poles, the said auxiliary winding being accommodated in the bottom part of the said slots, wound in the same direction as, but with a different pitch from the said main winding, and containing groups of at least two turns between adjacent commutator bars, the turns belonging to each of said groups being accommodated in different slots from those slots accommodating the turns of the said main winding connected to the same commutator bars, and the turns of each said group being accommodated in at least two different pairs of slots under different pairs of poles, the said pairs of slots accommodating turns belonging to at least one of said groups of auxiliary turns connected to adjacent commutator bars.

9. An armature for an alternating current commutator machine with laminated iron core and slots therein, the said slots containing an armature winding consisting of a multiple lap main winding accommodated in the top part of said slots, and a series parallel auxiliary winding parallel connected to and having a higher reactance than the said main winding, the number of commutator bars being adjusted according to the requirements of the series parallel auxiliary winding, the said auxiliary winding being accommodated in the bottom part of the said slots, wound in the same direction as, but with a different pitch from the said main winding, and the groups of turns of said auxiliary winding containing as many series connected coils as there are pairs of poles being accommodated in different slots from those slots accommodating the turns of the said main winding connected to the same commutator bars, and the turns of each said group being accommodated in at least two different pairs of slots under different pairs of poles, the said pairs of slots accommodating turns belonging to at least one of said groups of auxiliary turns connected to adjacent commutator bars.

10. An armature for an alternating current commutator machine with laminated iron core and slots therein, the said slots containing an armature winding consisting of a main winding accommodated in the top part of said slots, the said main winding having coils of different pitch connected to subsequent commutator bars and an auxiliary winding parallel connected to and having a higher reactance than the said main winding, the said auxiliary winding being accommodated in the bottom part of the said slots, wound in the same direction as the said main winding, and containing groups of at least two turns between subsequent commutator bars, the turns belonging to each of said groups being accommodated in different slots from those slots accommodating the turns of the said main winding connected to the same commutator bars, and the said turns of at least part of said group being accommodated individually in at least two different parts of slots.

11. An armature for an alternating current commutator machine with laminated iron core and slots therein, the said slots containing an armature winding consisting of a main winding accommodated in the top part of said slots, and an auxiliary winding parallel connected to and having a higher reactance than the said main winding, the said auxiliary winding being accommodated in the bottom part of the said slots, and wound in the same direction as the said main winding, the said auxiliary winding having coils of different pitch connected to subsequent commutator bars and containing groups of at least two turns between subsequent commutator bars, the turns belonging to each of said groups being accommodated in different slots from those slots accommodating the turns of the said main winding connected to the same commutator bars, and the said turns of at least part of said group being accommodated in at least two different pairs of slots.

12. An armature for an alternating current commutator machine with laminated iron core and two sets of slots at different radii therein, the said slots containing an armature winding consisting of a lap main winding accommodated in the set of said slots near the surface, and an auxiliary winding parallel connected to and having a higher reactance than the said main winding, the said auxiliary winding being accommodated in the set of the said slots at the inner radius and wound in the same direction as the said main winding which is connected only to a proportion of the commutator bars while the said auxiliary winding is connected to all the commutator bars, and at least one conductor of the group of conductors of the said auxiliary winding connected between two commutator bars to which said main winding is connected being accommodated in the same slots with conductors belonging to groups of conductors of said auxiliary winding connected to adjacent commutator bars.

BENNO SCHWARZ.